March 17, 1936.  J. T. MAULDIN  2,034,628
AUTOPLOW
Filed Dec. 6, 1934

Inventor
J. T. Mauldin
By C A Snow & Co.
Attorneys.

Patented Mar. 17, 1936

2,034,628

UNITED STATES PATENT OFFICE 2,034,628

AUTOPLOW

Joseph T. Mauldin, Milan, Tenn.

Application December 6, 1934, Serial No. 756,342

1 Claim. (Cl. 97—59)

The device forming the subject matter of this application is a garden plow of the general type shown in my prior Patent No. 1,323,082, granted on November 25, 1919. Generally considered, the present object is to provide a device of the class described, so constructed that it will remove all work from the hands, arms and shoulders of the operator, saving only the guiding of the plow and the gauging of the depth to which the plow share penetrates. More specifically, it has been found by experiment that the plow should be operated with the thrust member lower down on the body of the operator than was contemplated in my aforesaid patent.

The invention aims to provide a means whereby that may be done, using, at the same time, the highly advantageous structure which results from mounting the plow share on the operating member by which the plow share is raised and lowered, the plow share being connected to the said member, intermediate the ends thereof.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
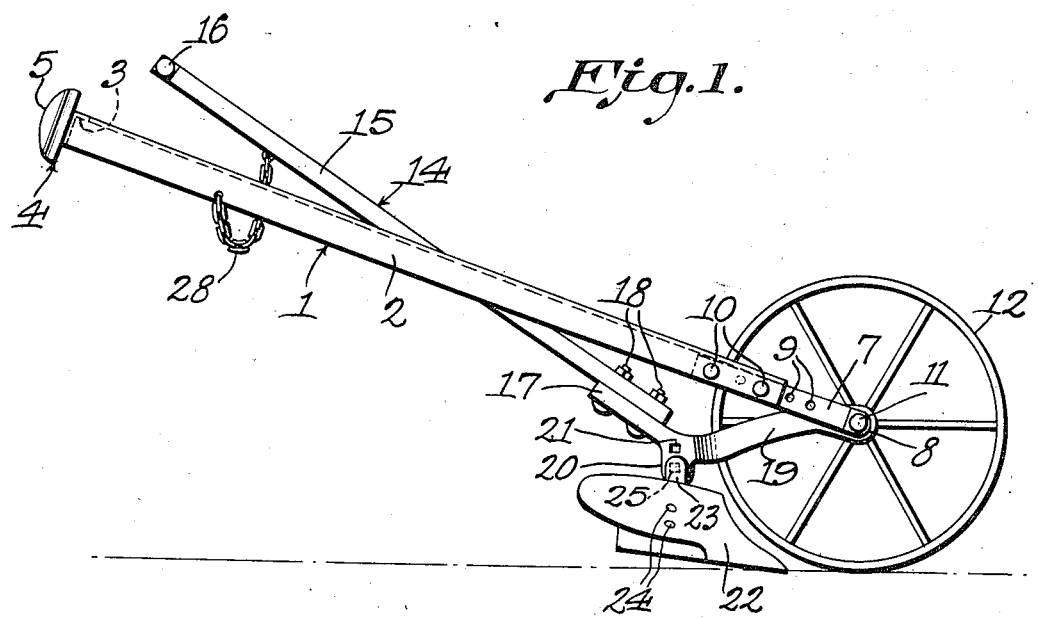
Fig. 1 shows, in side elevation, an implement constructed in accordance with the invention.

In carrying out the invention, there is provided a body-engaging thrust member, by which the implement is advanced. The body-engaging thrust member is designated generally by the numeral 1, and comprises converging side pieces 2, connected at their rear ends by a cross bar 3, the cross bar carrying a body rest 4. The body rest 4 has a rearwardly convexed surface 5, and the body rest 4 is rounded off at its ends, as shown at 6, the specific construction of the part 4 being desirable, owing to the particular place where it comes into contact with the body of the operator, as will be described hereinafter. Saving for the rounded off surfaces 6, the rear edge of the body rest 4 is straight.

The thrust member 1 includes extensions 7 for the side pieces 2, the extensions 7 being straight, saving for the fact that their forward ends 8 are brought into parallel relation. This construction is desirable, over and above what has been shown in my aforesaid patent, in that the frame or member 1 is narrowed at its forward end, and will not interfere with standing plants. The extensions 7 are supplied with openings 9, in which are mounted securing elements 10, connecting the rear ends of the extensions 7 to the forward ends of the side pieces 2 of the thrust member 1.

An axle 11, such as a bolt, is mounted in the parallel ends 8 of the extensions 7 which form parts of the thrust member 1. A ground wheel 12 is journaled for rotation on the axle 11, between the extensions 7.

The numeral 14 designates, generally, a share-operating member, comprising a bar 15. The intermediate portion of a transverse grip 16 is secured to the rear end of the bar 15. The bar 15 and the grip 16 are short enough so that the rear part of the operating member 14 can move upwardly and downwardly, freely, between the side pieces 2 of the thrust member 1. The share operating member 14 comprises a downwardly convexed bracket 17, the rear end of which is connected by securing elements 18 to the forward end of the bar 15. The bracket 17 includes a forwardly extended fork 19, mounted to swing vertically on the axle 11, between the ground wheel 12 and the parts 8 of the extensions 7 which form part of the thrust member 1. Intermediate its ends, the bracket 17 is supplied with a downwardly extended lug 20 in which there are rectangular openings 21. A plow share is shown at 22, and a lateral arm 23 is connected to the plow share, as shown at 24. The arm 23 terminates in a rectangular shank 25, adapted to be received in any of the openings 21 on the lug 20 of the bracket 17. The shank 25 terminates in a spindle 26, on which a nut 27 is threaded, to hold the arm 23, and consequently the plow share 22, assembled with the lug 20 of the bracket 17.

The share-operating member 14 extends upwardly and rearwardly, from a point below the thrust member 1, to a point above the thrust member. Downward movement of the share operating member 14 may be limited by flexible elements 28, such as chains, connected to the bar 15 of the operating member 14 and to the side pieces 2 of the thrust member 1.

Figure 2:
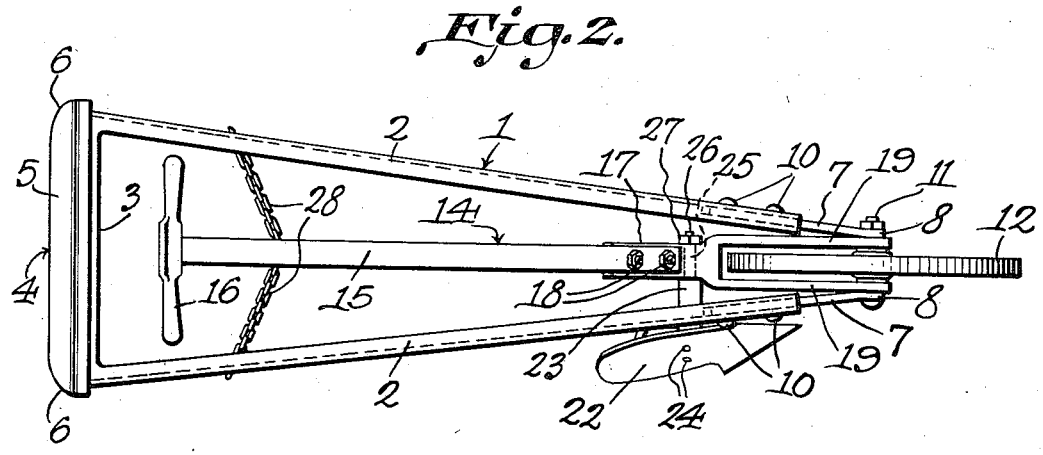
Fig. 2 is a top plan.
Figure 3:
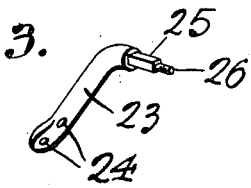
Fig. 3 is a perspective view of an arm which enters into the construction of the device.

The share 22 has been shown in the form of a turning plow, but a middle buster, a shovel or the like might be substituted, and the specific location of the share 22 at one side of the device, as shown in Fig. 2, is not insisted upon.

The adjustment between the parts 2 and 7, afforded by the holes 9 and the securing elements 10, enables the transverse grip 16 to be located properly with respect to the body rest 4 of the thrust member 1.

In my prior Patent No. 1,323,082 of November 25, 1919, there is shown a device of the class described, comprising an axle, a ground wheel journaled on the axle, a rearwardly extended body-engaging member mounted to swing vertically on the axle, operating bars mounted to swing vertically on the axle and terminating in handles located above the body-engaging member, and rigid connections joining the intermediate portions of the operating bars with the plow beams.

The device shown in my said patent was intended to be advanced, with the body-engaging member in contact with the body of the operator, about at the umbilicus, stated in plain language, by belly-thrust, purely and simply. It developed in practical operation, extended over many years, that the umbilical region was too high a point from which to derive the pressure for advancing the implement. That is true for at least two reasons. One of those reasons is that the closer the body-engaging member approaches parallelism with the surface of the soil, the easier can the implement be thrust ahead. Another reason why the umbilical region is too high is that when pressure is applied to the human body at that point, there is a tendency to crowd the abdominal organs down, something which does no operator any good, and is highly objectionable if the operator happens to be ruptured.

It might seem offhand that if an operator wanted to lower the rear end of the thrust member in my patent, until the thrust member made contact with the body well below the umbilicus, and in the region of the pubis, he would be at liberty to do so. In practical operation, such is not the case. Still referring to my said patent, if the rear end of the body-engaging member is lowered to the vicinity of the pubis, the thrust along the body-engaging member is so near to parallelism with the surface of the soil that the thrust does not have a vertical component of sufficient intensity to keep the ground wheel down upon the soil in all instances. For example, with the body-engaging member lowered as aforesaid, the connections between the handled operating member and the plow beams do not always form a means for forcing the plow point into the soil. Rather, they form a fulcrum, upon which the handled operating member, acting as a lever of the first order, tends to raise the ground wheel from the surface of the soil. That difficulty is avoided in the device forming the subject matter of this application.

I am aware of the fact that it is not new to provide an implement of the class described, comprising a ground wheel, a handled plow carrier and a body-engaging thrust member, all mounted on one axle, the plow carrier being provided intermediate its ends with means for supporting a plow. Such a construction is disclosed broadly in Sheckler's Patent 1,135,062 of April 13, 1915, for instance. The showing of my Patent No. 1,323,082, wherein the handles are above the thrust member, is of course acknowledged. Yet so far as I am advised as to the state of the art, no prior inventor has dealt specifically with the problem of applying the thrust from the low point represented generally by the pubis, provided a means for solving that problem without raising the ground wheel at times above the surface of the soil, and made the handles capable of being raised to the position to which it should occupy, considered relatively to the lowered position of the thrust member, preserving at the same time, the advantages which arise from mounting the share on the intermediate portion of the operating member, as disclosed in Fig. 1 of the present case.

Having thus described the invention, what is claimed is:

A garden plow embodying an axle, a ground wheel journaled on the axle, a body-engaging thrust member mounted at its forward end on the axle to swing vertically, a plow operating member mounted at its forward end on the axle to swing vertically, a grip on the rear end of the operating member in advance of the rear end of the thrust member, the operating member including a forward part which extends from the axle rearwardly downwardly and then upwardly forming a wide V, a rear part which extends upwardly from the rear of the forward part rearwardly to dispose the grip above the thrust member, the thrust member being centrally open, so that the operating member and the grip can be swung downwardly through the thrust member, and means for mounting a share directly on said forward part of the operating member at the point of the V below the thrust member and adjacent to the ground wheel.

JOSEPH T. MAULDIN.